(12) United States Patent
Cerny

(10) Patent No.: US 6,306,330 B1
(45) Date of Patent: Oct. 23, 2001

(54) TWO-STEP MOLDING OF LINER COMPONENTS FOR A CLOSURE

(75) Inventor: David L. Cerny, Crawfordsville, IN (US)

(73) Assignee: Alena Closure Systems International, Crawfordsville, IN (US)

( * ) Notice: Subject to any disclaimer, the term of this patent is extended or adjusted under 35 U.S.C. 154(b) by 0 days.

(21) Appl. No.: 09/360,085

(22) Filed: Jul. 23, 1999

(51) Int. Cl.$^7$ .................................................. B29C 43/18
(52) U.S. Cl. .................. 264/255; 264/266; 264/268; 264/274
(58) Field of Search ....................... 264/268, 250, 264/255, 254, 266, 274

(56) References Cited

U.S. PATENT DOCUMENTS

| | | | |
|---|---|---|---|
| 2,068,389 | * 1/1937 | Smith | 215/43 |
| 3,189,209 | * 6/1965 | Owens | 215/40 |
| 4,343,754 | * 8/1982 | Wilde et al. | 264/154 |
| 4,378,893 | 4/1983 | Wilde et al. | |
| 4,497,765 | 2/1985 | Wilde et al. | |
| 4,938,370 | 7/1990 | McBride | |
| 5,056,659 | 10/1991 | Howes et al. | |
| 5,806,707 | 9/1998 | Boehm et al. | |

FOREIGN PATENT DOCUMENTS 464721    12/1968    (CH) .

* cited by examiner

Primary Examiner—Jan H. Silbaugh
Assistant Examiner—Edmund H. Lee
(74) Attorney, Agent, or Firm—Rockey Milnamow & Katz, Ltd.

(57) ABSTRACT

A simulated promotional pocket for a closure and method for manufacture thereof has a cup-shaped simulated promotional pocket molded within the closure to at least partially encapsulate anchor tabs extending from a liner pre-molded to an inside of the top wall of the closure. The anchor tabs are arranged in a target formation of concentric spaced-apart circles and are bent over outwardly during pressure molding of the cup-shaped promotional pocket to provide resistance to separation of the promotional pocket and the liner. The simulated promotional pocket having an open end is configured to be identical in appearance to an actual promotional compartment which holds a promotional item of value thereon, when viewed from outside a container closed by the closure.

7 Claims, 4 Drawing Sheets

TWO-STEP MOLDING OF LINER COMPONENTS FOR A CLOSURE

FIELD OF THE INVENTION

The present invention relates to molding of closures such as for bottles, and more particularly to a two-step molding method for a closure adapted particularly for molding a simulated promotional compartment inside the closure.

BACKGROUND OF THE INVENTION

Various types of container closures, such as those used for sealing bottled soft drinks, are known in the art. One such commonly used closure is formed of plastic and includes a circular top wall portion and an internally threaded depending skirt portion which threads onto an associated container. For improved sealing, many such closures include a liner positioned on the inside surface of the top wall.

Examples of such closures and methods of making such closures are disclosed in U.S. Pat. Nos. 5,205,426 to McBride et al. and 4,497,765 to Wilde et al., hereby incorporated by reference.

Soft drink manufacturers and bottlers presently use closures and closure liners for promotional campaigns. Container closures and liners have been used as redemption pieces for reduced pricing or rebates, and sweepstakes or game prize pieces, in many known promotional campaigns.

In a typical promotional application, a logo or other representation for prize redemption, such as a prize amount award amount or item, is printed or transferred onto the inside of the closure cap or liner. Such prize pieces, however, must be redeemed through either the retailer or directly through the soft drink manufacturer or bottler. While this type of promotional campaign, for the most part, is effective and is well accepted by the consuming public, it does not provide the consumer with the excitement of being an on-the-spot, instant winner.

In many promotional campaigns, it is desirable to provide the player, i.e., the soft drink purchaser, "instant gratification". As such, the promotional or gaming piece itself must have a value, preferably in cash, or otherwise instantly redeemable. In such a promotional campaign, it is most preferable to provide a closure cap which can contain or store the promotional piece within the cap. For example, as part of the promotion, cash incentives can be packaged in the closure. The incentives can be packaged within the closure in a promotional piece compartment to prevent pilferage when the containers are stored on a food market shelf.

In such a promotional campaign, it may also be desirable to provide a closure without the promotional piece with cash incentive, but instead, having a message to urge the purchaser to "please try again". Such a closure can be provided with a simulated promotional piece compartment, securely molded to an inside of the closure, without adversely affecting the ability of the closure to retain a seal with the container. The simulated promotional piece compartment advantageously appears identical to the promotional piece compartment when viewed from outside of a closed container. There is a need for providing an economical, effective and reliable method for installing the simulated promotional piece compartment within the closure.

SUMMARY OF THE INVENTION

A simulated promotional piece compartment for a closure is provided which includes a disk-shaped wall and a depending annular wall with an open end, wherein the simulated promotional piece compartment is mold-fastened to a pre-installed liner within the closure. The pre-installed liner can include raised tabs extending in a direction toward an open end of the closure. The simulated promotional piece compartment is molded in a second step, within the closure, and onto the raised tabs which act as anchors by at least partially encapsulating the tabs. The raised tabs can be bent over under pressure during the molding of the simulated promotional piece compartment. When the simulated promotional piece compartment has solidified, the bent over tabs are enhanced as anchors to hold the simulated promotional piece compartment securely in place to the inside liner of the closure. The tabs are preferably arranged in concentric, spaced-apart circular patterns forming a "target".

The simulated promotional piece compartment is advantageously a cylindrical element with a disk-shaped plate at one end thereof which encapsulates the tabs; and open at an opposite end thereof. The simulated promotional compartment is shaped and sized to be visibly identical to an actual promotional piece compartment (which is typically an enclosed, sealed volume within the closure for holding a valuable promotional piece), when viewed from outside a full bottle closed by the closures.

Although in the disclosed embodiment the securement of a simulated promotional piece compartment to a liner is described, the two-step molding process of the present invention can also be applied to secure other type of components to an inside surface of a closures. The two-step molding process can be used to secure winning promotional compartments as well.

The simulated promotional piece compartment described may be used in conjunction with a first step molded-in liner positioned in a closure cap, the liner preferably having a first side adjacent to a top wall portion of the closure cap. The liner can include an annular sealing bead portion for providing a seal between the closure cap and the container such as a bottle, when the closure is engaged therewith. The simulated promotional piece compartment is molded and integrated with the liner in a second molding step.

An advantageous, two-step method for making the closure liner and simulated promotional piece compartment allows for the initial molding of the liner within the closure cap, the liner including upstanding tabs, and the subsequent molding of the simulated promotional piece compartment onto the tabs under pressure to bend the tabs to form anchors for fixedly holding the simulated promotional piece compartment.

Other features and advantages of the present invention will be apparent from the following detailed description, the accompanying drawings, and the appended claims.

DETAILED DESCRIPTION OF THE PREFERRED EMBODIMENTS

Figure 1:
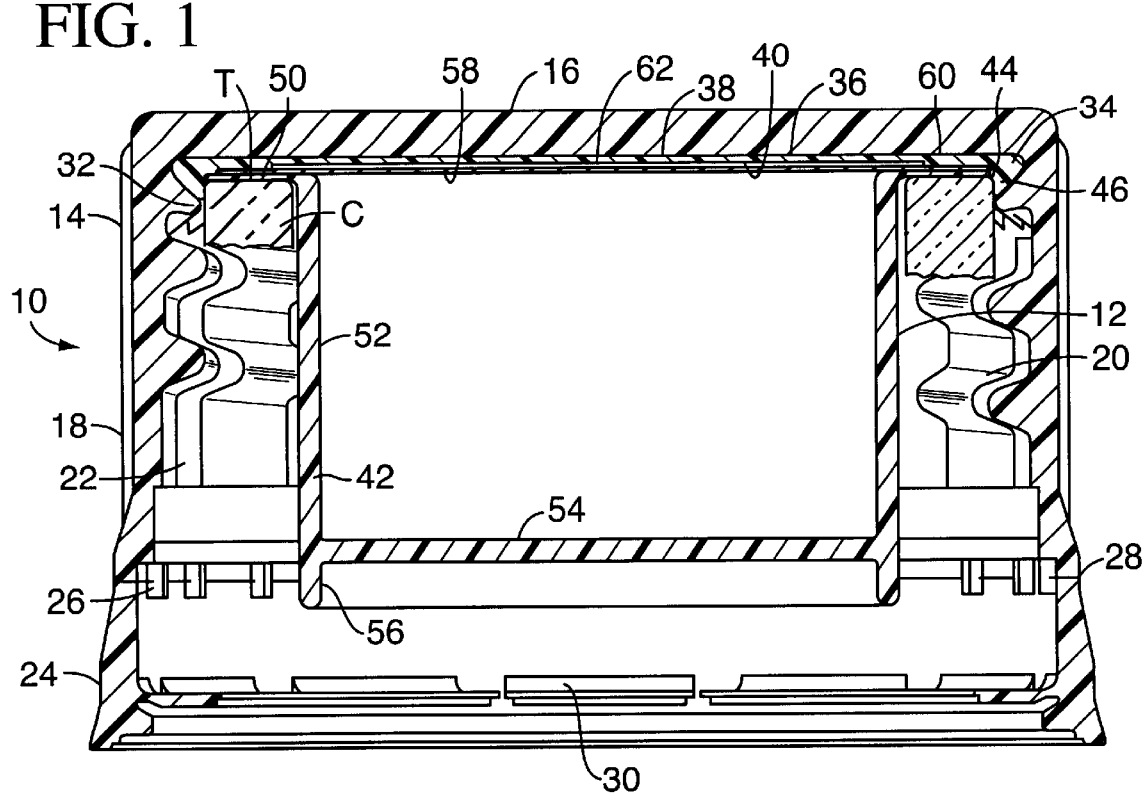
FIG. 1 is a sectional view of a promotional piece compartment contained within a closure.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

With reference now to FIG. 1, there is shown an exemplary closure having an embodiment of a removable, inner promotional compartment 12 positioned therein. As illustrated, closure 10 is generally cup-shaped and includes a closure cap 14:, a circular top wall portion 16 and a depending annular skirt portion 18 depending from the top wall portion 16.

Skirt portion 18 has an internal thread formation 20 on the inside surface thereof for threadingly engaging a cooperative container C to which the closure 10 is fitted. Vent grooves 22 which extend axially along the inside of skirt portion 18 traverse the thread formation 20. The vent grooves 22 facilitate the release and venting of gas which may pressurize the container when the container is used to store, for example, carbonated beverages.

In a preferred embodiment, closure 10 is formed with a pilfer band 24 to provide visibly discernable evidence that the closure 10 has been partially or completely removed from the container C.

The pilfer band 24 is connected to the skirt portion 18 by a plurality of frangible rib-like bridges 26 which extend between the inside surfaces of the skirt portion 18 and the pilfer band 24. The pilfer band 24 is otherwise separated and distinguished from the skirt portion 18 by a circumferential score line 28 which extends through the side wall of the closure 10 and partially into the frangible ribs 26.

The pilfer band can be configured in accordance with the teachings of U.S. Pat. No. 4,936,370 to McBride, and formed attendant to compression molding of the closure in accordance with the teachings of U.S. Pat. No. 4,497,765 to Wilde et al.; both of which patents are commonly assigned herewith, and both of which patents are hereby incorporated by reference.

In the exemplary closure 10, the pilfer band 24 has a plurality of inwardly extending tabs 30. Upon initial engagement of the closure 10, to the container C, the tabs 30 pivot in an upward manner and pass over an annular locking ring (not shown) of the container.

Pilfer indication is provided in that upon the first removal of the closure 10 from the container C, the tabs 30 engage the locking ring and provide sufficient resistance so that the pilfer band 24 separates from the skirt portion 18 at the score line 28.

In a current embodiment, as best seen in FIG. 1, the closure 10 has a lip 32 extending upwardly and inwardly of the closure 10 generally at the juncture of the top wall portion 16 and the skirt portion 18.

Lip 32 extends circumferentially of the closure 10, and may be formed as a continuous element, or may be formed in discrete segments. A recess 34 may be formed between the lip 32 and the top wall portion 16.

A liner 36 may be formed in closure 10 using a molded-in process such as that disclosed in the aforementioned U.S. Pat. No. 4,497,765 to Wilde et al.

The liner 36 has a first side 38 which is positioned adjacent the top wall portions 16 and a second side 40 which extends inward of the closure 10. The liner 36 is preferably formed from substantially opaque material to deter detection of the promotional compartment 12 and/or its contents.

In the embodiment of the closure 10 illustrated in FIG. 1, the removal, inner promotional compartment 12, includes a generally cup-shaped body 42, having a flange portion 50. The flange 50 is configured to engage a retaining element 44 which is defined by a portion of the liner 36. In the illustrated embodiment, the retaining element 44 is defined by a bead-like portion 46 of the liner 36, which extends, in part, into the recess 34 of the cap 14.

When the closure 10 is assembled, the flange portion 50 is adjacent to and in contact with the second side 40 of the liner 36. A cylindrical, depending wall 52 depends from the flange portion 50 and defines the compartment 12. A circular end wall 54 extends across the depending wall 52 to enclose the compartment 12. The compartment 12 might also include a wall extension 56 which provides a grasping region to facilitate removing the compartment 12 from the closure 10.

The compartment 12 preferably includes a sealed cover element 58 which extends across at least a portion of the flange 50, and seals the open end of the compartment 12 from the closure 10 and from the contents of the container C. The cover element 58 may be formed of a non-porous material, such as aluminum, an aluminum-polymer laminate structure or the like. The cover may be sealed to the flange 50 by methods such as heat-sealing, hot melt gluing and the like, such methods being recognized by those skilled in the art.

The sealed area between the cover element 58 and the flange 50 may extend across a width of the flange 50 or across a width of only a part thereof, circumferentially sealing the compartment 12, and defining an unsealed peripheral region or removal region 60, for grasping and removing the cover element 58 from the compartment 12.

When the closure 10 is engaged with the container C, the flange 50 is disposed between the top surface T of the container and the liner 36. The flange 50 is of sufficient diameter to extend across the container C opening and abut the retaining element 44. As the closure 10 is snugly engaged with the container C, the retainer element 44 is deformed to engage the flange 50 and retain the compartment 12 in place in the closure 10. With the compartment 12 in place in the closure, a relatively small gap 62 is defined between the liner 36 and the sealed cover element 58.

It is contemplated that the promotional closure 10 including the removable compartment member 12, will be used in a promotional gaming system. The gaming system will include a plurality of closures 10 which include the removal of compartment 12, and a plurality of "simulated" promotional piece containing closures, for example as described below with regard to FIG. 2.

Figure 2:
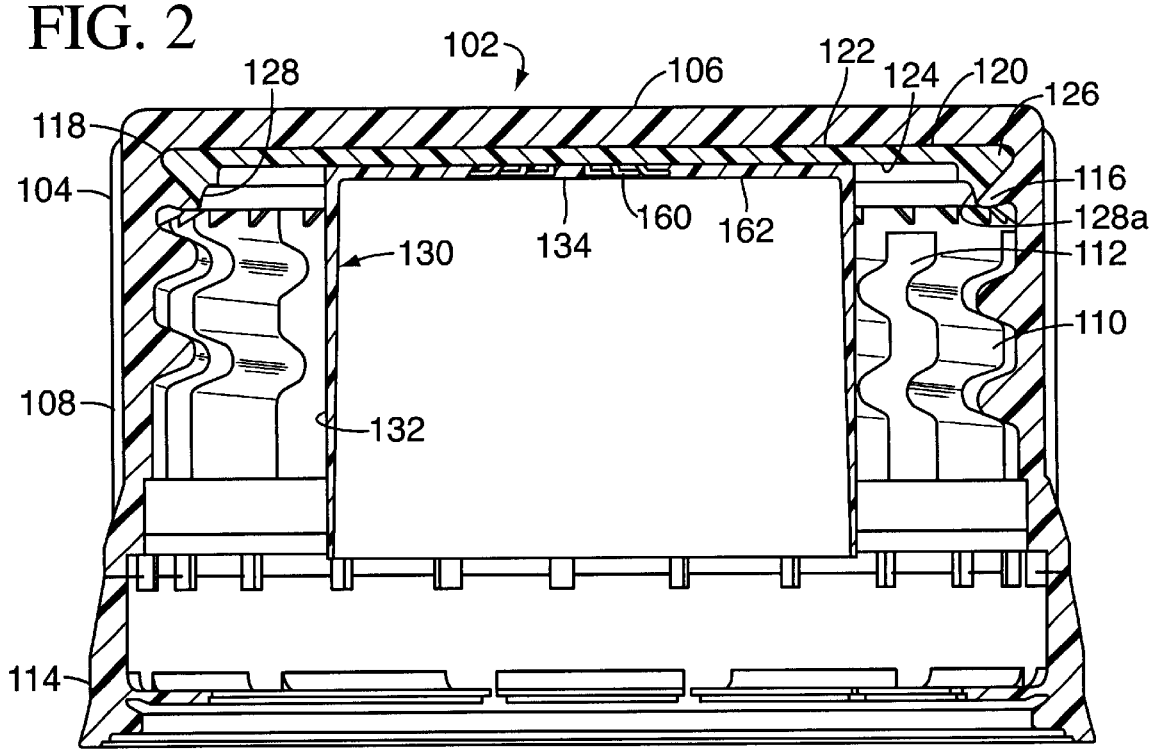
FIG. 2 is a sectional view, of a simulated promotional piece compartment within a closure according to the present invention.

FIG. 2 illustrates a simulated promotional piece compartment which serves as a non-winning promotional piece or "decoy" piece, in the overall gaming system. The simulated promotional piece compartment need not employ the more complex, removal and sealing structures of the promotional containers shown in FIG. 1, but can simply be permanently molded to the liner.

The simulated closure 102 includes a plastic closure cap 104 which is similar to cap 14. The cap 104 includes a circular top wall portion 106 and a depending annular skirt portion 108 depending from the top wall portion 106. The skirt portion 108 has an internal thread formation 110 on the inside surface thereof for threadingly engaging a cooperative container C to which the closure 102 is fitted. Vent grooves 112 which extend axially along the inside of the skirt portion 108 traverse the thread formation 110. The vent grooves 112 facilitate the release and venting of gas which may pressurize the container when the container is used to store, for example, carbonated beverages.

Similar to the closure 10, closure 102 may be formed with a pilfer band 114 to provide visibly discernible evidence that the closure 102 has been partially or completely removed from the container. The band can be configured in accordance with the teachings of the aforementioned U.S. Pat. No. 4,938,370 to McBride and formed in accordance with the teachings of the aforementioned U.S. Pat. No. 4,497,765 to Wilde et al.

The closure 102 has a lip 116 extending inwardly thereof generally at the juncture of the top wall portion 106 and the skirt portion 108. Lip 116 extends circumferentially of the closure 102, and may be formed as a continuous element, or may be formed in discrete segments. A recess 118 is formed between the lip 116 and the top wall portion 106.

A liner 120 may be formed in the closure 102 using a suitable in situ compressing molding process. The liner 120 has a first side 122 which formed adjacent to the top wall portion 106, and a second side 124, which extends inward of the closure 102. The liner 120 is retained in place in the closure 102 by a retaining bead 126 which extends circumferentially around the liner 120, into the recess 118, and engages the lip 116, and/or by bonding the liner to the closure. The retaining bead 126 defines, in part, a sealing bead portion 128 for sealing against the top/outside surface T of the container C.

Figure 7:
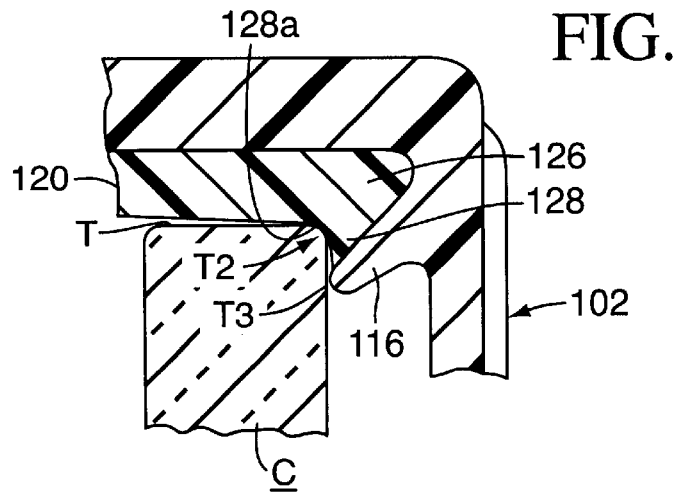
FIG. 7 is an enlarged partial sectional view taken from FIG. 2.

As illustrated in FIG. 7, the sealing bead portion 128 is advantageously arranged having a concave surface 128a which engages the finished rounded outside annular edge T2 of the container C when the closure 102 is fully engaged therewith, to seal the container to the closure 102. Closures are subjected to the internal pressure of the containers, especially for carbonated beverages. Over time, the top wall portion 106 can become slightly bowed upwardly. A flat-surface-to-flat surface seal (a so-called top seal) between the surface T and the liner 120 can become separated resulting in an ineffective seal.

With the disclosed seal shape, the concave surface 128a is urged inwardly against the edge of the containers and the seal is maintained. The surface 128a exerts a sealing force on both the top surface T and side surface T3 of the Container C.

An open, non-sealing depending simulated promotional piece compartment or compartment or "pocket" 130 depends from the second side 124 of the liner 120.

The pocket 130 extends downward, relative to the liner 120, and is open to the contents of the container C. The pocket 130 is preferably configured such that the outer wall 132 thereof does not form a seal with the inner surface of the container finish (not shown).

The simulated promotional closure 102 is configured to resemble and to be indistinguishable from the promotional closure 10, when the closures 10, 102 are placed on, and engaged with the respective container C. The containers and contents will, of course, be identical, thus enhancing the inability to distinguish between the closures 10, 102.

The gaming system includes a plurality of promotional enclosures 10 having promotional pieces P, such as a one-dollar bill, inserted and sealed therein, and a plurality of simulated promotional closures 102. All of the closures 10, 102 will be engaged with a container, in commonly recognized fashion. As previously provided, the promotional closures 10 and the simulated promoted closures 102 will be indistinguishable, one from the other, when placed on a container which is filled with a soft drink. Purchasers of the soft drink with the promotional closure will be instantly rewarded upon opening the container and compartment by receiving "on-the-spot" promotional pieces. Those who purchase the soft drink with the simulated promotional closure 102 will no doubt be disappointed, however they may be consoled by indicia 134, such as "please try again" appearing in the closure.

The simulated promotional closures 102 can be provided with indicia means therein, which may be printed, molded, or otherwise provided. Such indicia means can be associated with an additional award of the present gaming system, thus providing a "game-within-a-game", a plural mode by which consumers can receive promotions from the gaming system. Thus, even those closures of the system not containing promotional items within a compartment may nevertheless be employed for potential awards.

FIG. 2 shows that the liner 120 includes centrally thereof a plurality of bent-over or L-shaped tabs 160 extending downward from the, liner 120 and embedded in a top plate 162 of the promotional pocket 130.

The L-shaped tabs 160 act as anchors to bond the promotional pocket 130 to the liner 120 to be held within the closure 102.

Figure 3:
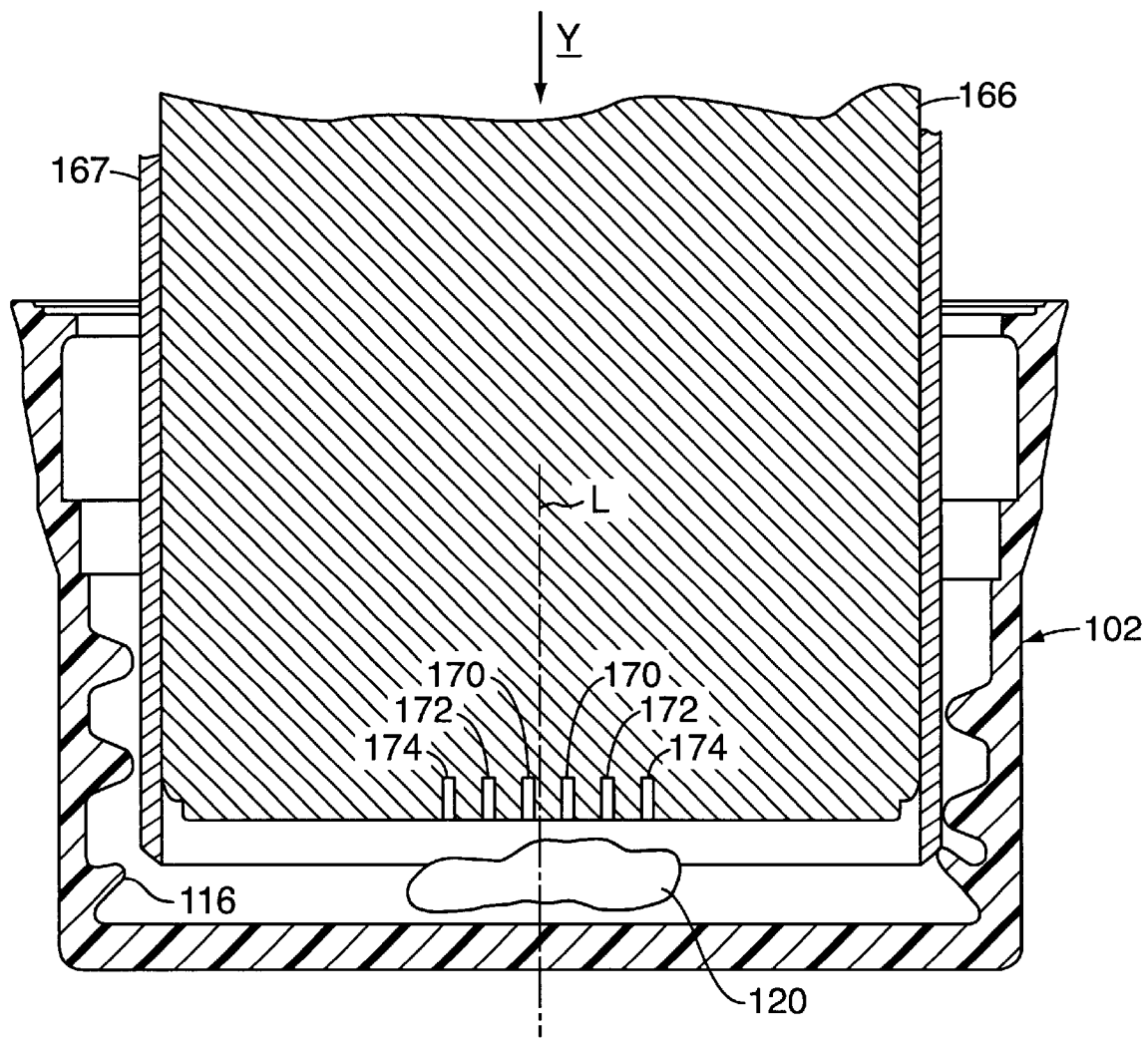
FIG. 3 is a sectional view of the closure shown in FIG. 2 in a first stage of liner manufacture.
Figure 4:
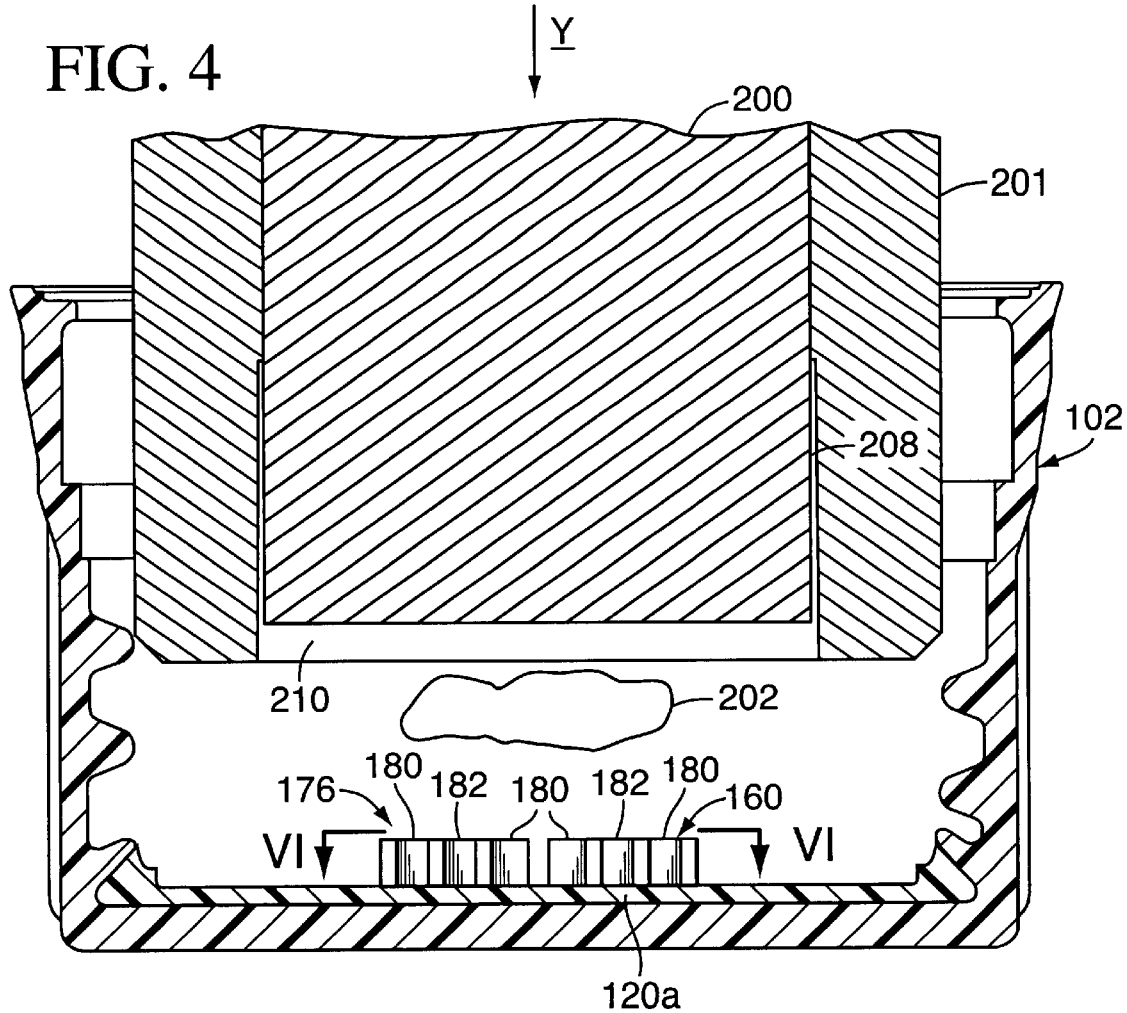
FIG. 4 is a sectional view of the closure shown in FIG. 3 in a subsequent stage of manufacture.
Figure 5:
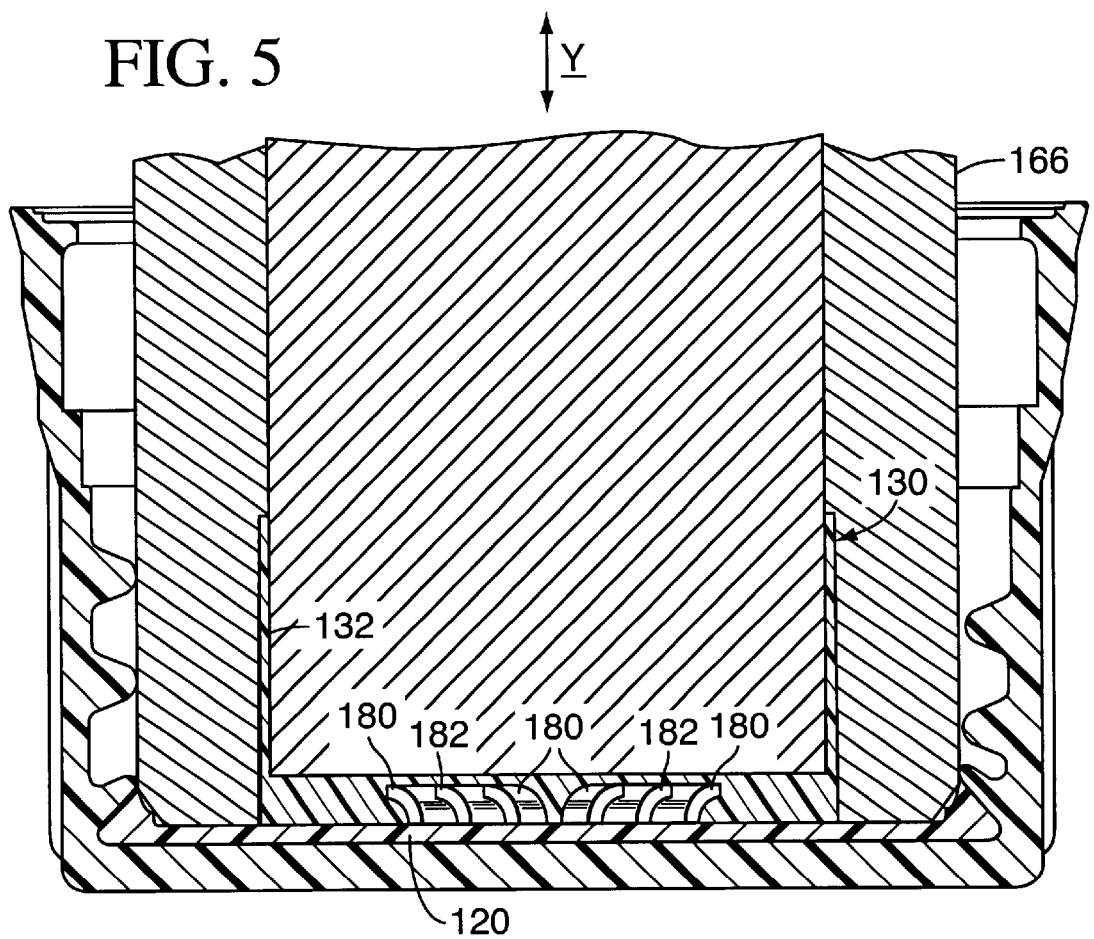
FIG. 5 is a sectional view of the closure of FIG. 4 in a still further stage of manufacture.

FIGS. 3–5 describe, in stages, the molding operation for manufacturing the closure 102 as shown in FIG. 2. FIG. 3 illustrates the initial forming of the liner 120 by a molding plunger 166 which exerts pressure on a molten pellet or charge of plastic 170 deposited within the cap 102. The molding plunger 166 includes a plurality of circumferential molding cavities 170, 172, 174, formed intermittently around spaced apart concentric circles C1, C2, C3 about a centerline L of the plunger 166 (See FIG. 6). After the outer sleeve 167 is moved into sealing engagement with lip 116 of the closure cap 102, the plunger 166 is pressed in the direction Y to compression mold the plastic pellet 170 into a liner stock piece 120a as shown in FIG. 4. The liner stock piece 120a includes in a center region a "target" 176 formed by the mold cavities 170–174.

Figure 6:
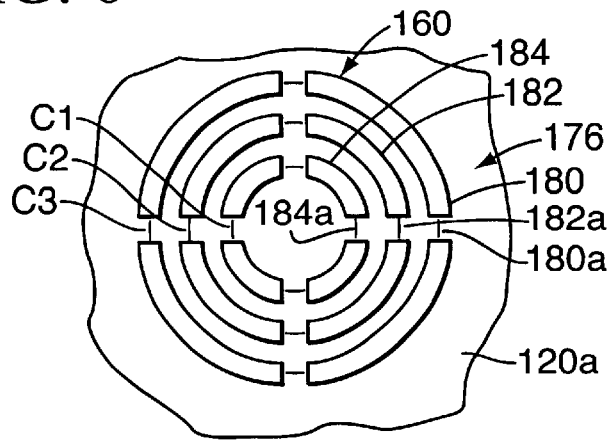
FIG. 6 is a sectional view taken generally along lines 6—6 of FIG. 4.

As illustrated in FIG. 6, the target 176 includes tabs 160 extending perpendicularly from a bottom surface 121 of the liner stock-piece 120a, and formed intermittently around the concentric circles C1, C2, C3 corresponding to the cavities 170, 172, 174. Four outer tabs 180, four intermediate tabs 182, and four inner tabs 184 are provided, the tabs having gaps 180a, 182a, 184a, between adjacent tabs, the gaps 180a, 182a, 184a located every ninety degrees around the concentric circles C1, C2, C3.

Returning to FIG. 4, a second step plunger assembly including a second step plunger 200 and an annular sleeve 201 are illustrated. Second step plunger 200 is used to reciprocate in a direction Y within the closure 102. The second step plunger 200 and the annular sleeve 201 together define an annular crevice 208 opening into a plate-shaped recess 210 at a leading end of the plunger 200. A molten plastic mass, preferably polypropylene, is placed within the closure cap above the target 176. Outer sleeve 211 positioned about plunger 200 is first moved downwardly into sealing engagement with the previously formed liner 120. The reciprocating second step plunger 200 thereafter compression molds the plastic mass 202 into the target 176 and into the annular crevice 208 and the plate-shaped recess 210 to form the pocket 130 as viewed in FIG. 5.

As can be seen in FIG. 5, the tabs 180, 182, 184 are deformed outwardly taking a generally inverted L-shaped posture in cross-section to form the L-shaped tabs 160 shown in FIG. 2. Diametrically opposed tabs are thus bent in opposite direction. By achieving a bent-over configuration such as shown in FIG. 5, the tabs 180, 182, are enhanced as anchors and encapsulated into the top plate 162 to hold the solidified simulated promotional pocket 130 fixedly to the liner 120. On retraction of the second step plunger 100 and the sleeve 201, the configuration as shown in FIG. 2 is achieved.

The tabs 180, 182, 184 need not be bent over into an L shape to adequately serve as anchors. A frictional or adhesive bonding of the tabs 180, 182, 184 to the top plate 162, will enhance bonding between the liner 120 and the pocket 130 even if the tabs are not bent but remain upright.

Although the two-step molding process is described with regard to the manufacture of a closure cap liner and simulated promotional pocket, the two-step molding process can be applied to other two-component article molding methods wherein a first component is molded and then a second component is molded onto the first component, the first component advantageously having tabs to anchor the second component to the first component.

From the foregoing, it will be observed that numerous modifications and variations can be effected without departing from the true spirit and scope of the novel concept of the present invention. It is to be understood that no limitation with respect to the specific embodiment as illustrated is intended or should be inferred. The disclosure is intended to cover by the appended claims all such modifications as fall within the scope of the claims.

What is claimed is:

1. A method of molding a component inside a closure, comprising the steps of:

providing within said closure a plurality of tabs extending substantially perpendicularly from an inside facing wall of said closure;

depositing a pellet of molten plastic onto said tabs;

compression molding said component from said pellet onto said inside facing wall by exerting pressure on said pellet and simultaneously exerting pressure onto said tabs to bend said tabs over to a non-vertical orientation with respect to said inside facing wall, said component having a portion which at least partially encapsulates said tabs to anchor said component to said inside facing wall.

2. The method according to claim 1, wherein said step of providing said plurality of said tabs is further defined by the steps of molding within said closure a liner having said tabs molded integrally therewith, said liner at least partially covering said inside facing wall.

3. The method according to claim 2, wherein said step of molding said component is further defined in that said portion comprises a plate-shaped top wall and said component further comprises a depending annular skirt, said depending annular skirt and said top wall being integrally molded together.

4. The method according to claim 1, wherein said step of providing a plurality of tabs is further defined by the steps of providing a mass of plastic within said closure and, using a molding plunger with tab-shaped cavities on a front surface thereof, compression molding a liner fixedly into a top section of said closure and simultaneously integrally molding said tabs into said tab-shaped cavities.

5. The method according to claim 4, wherein said step of pressure molding said tabs into said tab-shaped cavities is further defined in that said tab-shaped cavities are arranged as arcuate cavities arranged intermittently around concentric spaced-apart circles to form tabs of varying widths.

6. The method according to claim 1, wherein said closure includes a disk-shaped wall with a depending annular side wall, and an annular recess arranged between said disk-shaped wall and said annular side wall; and said step of providing a plurality of tabs is further defined by the steps of arranging a mass of plastic within said closure and using a plunger with a substantially planar face with cavities formed therein, compressing said mass of plastic to form a liner against said disk-shaped wall, said liner filling said annular recess and forming said plurality of tabs extending substantially vertically from said liner.

7. The method according to claim 6, wherein said step of molding said component is further defined by the steps of providing a second step plunger assembly having an annular crevice and a disk-shaped recess open to said annular crevice at a leading end of said second step plunger assembly, providing a second plastic mass within said closure between said second step plunger assembly and said plurality of tabs, translating said plunger assembly to compression mold said second plastic mass onto said plurality of tabs and into said crevice and said disk-shaped recess, simultaneously bending said plurality of tabs.

\* \* \* \* \*

UNITED STATES PATENT AND TRADEMARK OFFICE
CERTIFICATE OF CORRECTION

| | |
|---|---|
| PATENT NO. | : 6,306,330 B1 |
| DATED | : October 23, 2001 |
| INVENTOR(S) | : David L. Cerny |

Page 1 of 1

It is certified that error appears in the above-identified patent and that said Letters Patent is hereby corrected as shown below:

<u>Title page,</u>
Item [73], Assignee: change "Alena Closure Systems International" to -- Alcoa Closure Systems International --

Signed and Sealed this

Twenty-first Day of May, 2002

Attest:

Attesting Officer

JAMES E. ROGAN
*Director of the United States Patent and Trademark Office*